2,931,363
CONCAVE OVERLOAD RELEASE MECHANISM

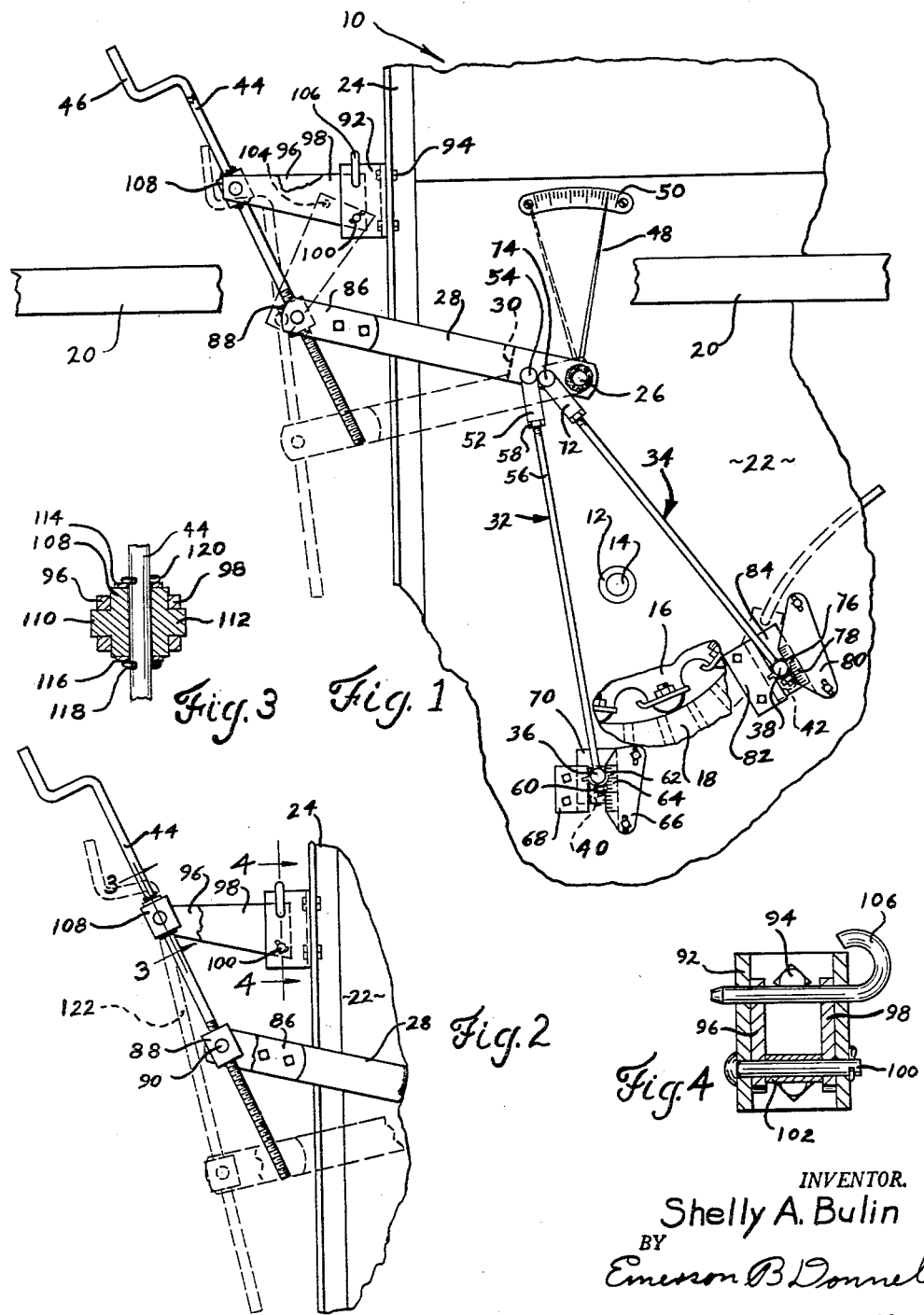

Shelly A. Bulin, Davenport, Iowa, assignor to J. I. Case Company, Racine, Wis., a corporation of Wisconsin Application May 28, 1957, Serial No. 662,239

4 Claims. (Cl. 130—27)

The present invention relates to a safety support and adjustment for thresher concaves and an object thereof is to generally improve the construction and operation of devices of this class.

In threshing mechanism, particularly in the type known as the rub bar type, a grate-like concave is supported adjacent the rotating threshing cylinder but spaced therefrom radially a small amount, on the order of one-eighth to three-fourths of an inch, and it is desirable in the operation of the machine to have rather accurate control of this spacing. Furthermore, it is common to require the spacing to be different at the two ends of the concave, as for example greater at the front where the material enters between it and the cylinder than at the rear where the material leaves. Furthermore, when adjustment is necessary, it follows generally a pattern wherein both ends of the concave are adjusted in the same direction but the front or entrance end is moved more than the rear or exit end. As is well known, to get the adjustment correct at both ends is not easy, even for a skilled operator and expedients are known for coordinating these adjustments as fully disclosed in the patent to Sherman C. Heth, No. 2,794,438, dated June 4, 1957, on which the present invention is an improvement. Furthermore, in mechanism of this class it is fairly common to have an excessive amount of crop material, known as a "slug," enter the space suddenly and overload the machinery, causing a severe thrust or pressure, tending to separate the concave and cylinder and, furthermore, at times a foreign object such as a stone, piece of wood or the like may be inadvertently drawn into the mechanism and cause substantial damage.

A further object, therefore, is to supply a concave which is readily adjustable in relation to the cylinder; in which the desirable relations between the entrance and the exit ends are automatically maintained; and in which, nevertheless, different adjustments are readily achieved, changed, and repeated from time to time as necessary.

A further object is to supply mechanism wherein the calibration of the foregoing is readily checked and corrected from time to time if necessary.

A further object is to supply means for readily releasing the concave for substantial extra spacing in the event of the occurrence of a slug, readily controllable from an operator's position.

A further object is to provide for automatically releasing the concave in the event of severe slugging or the ingestion of a foreign object, and a further object is to provide for the release of the concave under such conditions while maintaining the predetermined adjustment for restoration when the slug or foreign object is removed.

Further objects and advantages will become apparent from the following specification and annexed drawings in which Figure 1 is a left side elevation of a fragment of a threshing machine embodying the invention, with parts removed and with others broken away to show what lies beneath.

Fig. 2 is a similar view of a portion of Fig. 1 with the parts in a different position.

Fig. 3 is an enlarged sectional view on the line 3—3 of Fig. 2, and

Fig. 4 is an enlarged sectional view on the line 4—4 of Fig. 2.

Similar reference characters have been applied to the same parts throughout the drawings and specification.

As seen in Fig. 1, a casing generally designated as 10 constitutes the major portion of a combine or threshing machine and has a bearing 12 in which is journaled a shaft 14 supporting and driving a threshing cylinder generally designated as 16, the latter being of any well-known type but shown as of the rub bar type and co-operating with a concave generally designated as 18. Cylinder 16 is driven in any well-known manner not necessary to describe as such drive forms no part of the present invention. An operator's platform 20 is supported in convenient relation to the controls (not shown) of the combine, and casing 10 in the present instance is characterized by sheet metal walls 22 supported by an angle iron frame as 24.

Casing 10 also has journaled therein a rockshaft 26 primarily for supporting concave 18 as will be more apparent further on in this description. Shaft 26 has fixed thereon at opposite sides of casing 10 a lever 28 on the side next to the observer in Fig. 1 and 30 on the opposite side, and links 32 and 34 extend generally downwardly from lever 28 to the proximate ends of shafts or rods 36 and 38 which extend in the present instance along the front and rear ends respectively of concave 18 for supporting the same. Substantially identical links, not shown, extend from above-mentioned lever 30 to the distal ends of shafts 36 and 38 projecting on the far side of casing 10.

Shafts 36 and 38 extend outwardly from concave 18 through slots or openings 40 and 42 in wall 22 and through similar slots or openings on the far side of casing 10 as will be understood. From the structure so-far described, it will be apparent that rocking of shaft 26 will raise or lower, as the case may be, links 32 and 34 and thereby cause corresponding movement of concave 18, such rocking being effected in the present instance by a manually rotatable member or shaft 44 having a crank 46 in a convenient location in relation to platform 20, the adjustment obtaining at any time being shown by an index 48 fixed on rockshaft 26 and cooperating with a dial 50 carried in any suitable manner within convenient observance of an operator on platform 20, for example on wall 22.

Adjustment of concave 18 may thus be conveniently and promptly accomplished by such operator, and the adjustment existing at any time is readily observed on dial 50 and corrected if necessary.

Returning to a more detailed description of the mechanism, link 32 comprises a fitting or clevis portion 52 pivoted at 54 on lever 28 and having a rod 56 in the present instance threaded therein so as to be adjustable lengthwise by running it more or less into fitting 52, and a lock nut 58 engages fitting 52 to preserve the adjustment in well-known manner. Rod 56 in the present instance extends downwardly through support 36 and has a nut 60 against which supporting rod 36 rests. Rod 56 also passes through a pointer portion 62 which is held in fixed relation to rod 36 by the pressure of nut 60 and which travels adjacent a scale 64 on a plate 66 fixed on wall 22 and, with a plate 68, constituting guiding means for rod 36, a plate 70 on rod 36 sliding between plates 66 and 68 on the one hand and wall 22 on the other when rod 36 is moved, and closing slot 40 substantially at all times in the normal adjustment range of supporting rod 36.

Link 34 is preferably substantial identical with link 32 as are the corresponding links on the far side of casing 10, having a clevis 72 pivoted at 74, between above-mentioned clevis 52 and shaft 26, angling backwardly toward supporting rod 38, and having a pointer 76 cooperating with a scale 78 on a plate 80. A companion plate 82 cooperates with plate 80 and a plate 84 to guide rod 38 and close slot 42 in a manner similar to that hereinbefore described in connection with shaft 36.

Lever 28 has a plate 86 fixed thereto and which, together with lever 28, forms a clevis, receiving therein a block 88 having opposed trunnions as 90. Block 88 is bored transversely of trunnions 90 and internally threaded and receives therein rotatable element 44 which is externally threaded for part of its length as shown. Assuming element 44 secured against lengthwise movement, rotation thereof will cause movement of block 88 and swinging of lever 28, as will be apparent. Member 44 is secured against axial movement as follows:

A bracket 92, in the present instance of U shaped configuration, is bolted or otherwise fixed to angle iron frame 24 as by bolts 94, with its open end facing toward the left in Figs. 1 and 2, and supporting arms 96 and 98 are pivoted on a pin 100 and spaced in the present instance by a bushing 102 (see also Fig. 4). Arms 96 and 98 are provided with registering holes 104 which in the full line position are engaged by a manually removable pin or latch 106 inserted in suitable holes in bracket 92. In this manner, arms 96 and 98 are rigidly supported, extending to the left in Figs. 1 and 2, but may swing downwardly upon removal of pin 106 for a purpose to appear. Between arms 96 and 98 is supported a block 108 having trunnions 110 and 112 engaged in suitable openings in arms 96 and 98 as seen in Fig. 3. Block 108 is bored transversely of trunnions 110 and 112 and rotatable member 44 is supported in the bore and retained axially by washers 114 and 116. Washer 116 in the present instance may be secured axially on shaft member 44 in any suitable manner, but in the present instance a cotter pin 118 is extended through shaft 44 and engages the washer 116. Washer 114 is secured in the present instance in a similar manner, a cotter pin 120 being extended through a suitable bore 122, Fig. 2, in shaft 44.

Cotter pin 120 does more than to merely secure washer 114 and is intended to shear in the event of a common mishap which will be clear from the description of the operation which follows:

As heretofore stated, concave 18 may be raised and lowered by swinging of lever 28 and, as will now be apparent, this is accomplished by turning crank 46, shaft 44 being axially secured in block 108 while block 88 acts as the nut and travels up or down on the threaded portion of shaft 44, thus swinging lever 28 in the desired direction. If index 48 is to point out the precise adjustment of concave 18, it must be coordinated accurately with the relations it is to indicate. At the factory concave 18 is suitably adjusted by lengthening or shortening the suspending links 32 and 34 (and, of course, those on the far side of casing 10) until for example with index 48 on an arbitrary zero point on scale 50, concave 18 is actually in physical contact with cylinder 16. The adjustment is then locked and thereafter the distance of concave 18 from cylinder 16 is accurately indicated on scale 50. At the factory, concave 18 is preferably manually set at various distances from cylinder 16 at which time scales 64 and 78 are adjusted or calibrated so that pointers 62 indicate at all times the exact spacing of the front and rear ends respectively of concave 18 from cylinder 16. These indications are very unlikely to change in view of the rugged nature of the parts and the extremely short distance between the actual concave and the scales. On the other hand, the adjustment of links 32 may possibly change, casing 10 may become distorted or for a variety of other reasons the calibrations of index 48 may become inaccurate. In this event, it is a relatively simple matter to adjust links 32, 34 etc. until the indications on scales 64 and 78 corroborate the reading of index 48, whereupon the device will be restored to its original usefulness, and the accuracy of the readings of index 48 may be checked with scales 64 and 78 whenever desired.

In the operation of threshing mechanism the crop material is supposed to be fed at a steady even rate as fast as the available power and other conditions will permit, but occasionally material will arrive at the cylinder inadvertently in relatively large masses or slugs which momentarily overload the mechanism, causing the cylinder to slow down and sometimes even to stop entirely with the usual clearances entirely plugged or jammed with crop material. On occasions it has been necessary in the past to dismantle the machine in order to rotate the cylinder and clear it in order to restore operation. In the event of serious slugging in the present construction, the spacing may be substantially instantly increased enough to pass the slug on through and prevent an interruption of operation. This is done by removing pin 106, whereupon arms 96 and 98 may swing downwardly into the dotted position of Fig. 1, thereby swinging lever 28 also into the dotted position and lowering concave 18 substantially below its normal lower operating position, thus allowing the slug to pass through. If the machine has been completely stopped by the slug, the same remedy is available, the dropping of the concave releasing the slug to such an extent that cylinder 16 may be readily rotated by the usual power supply, clearing out the slug, after which crank 46 is manually raised, swinging arms 96 and 98 back to the full line position, whereupon pin 106 is replaced.

It is to be noted that crank 46 has not been turned during this operation and that, therefore, whatever adjustment of concave 18 existed before the slug was encountered is restored by merely raising the crank and replacing pin 106.

Another common mishap in the operation of mechanism of this class is the picking up of a stone, piece of wood or the like, which jams between the concave and the rapidly rotating cylinder and produces an extremely severe downward pressure on concave 18. This strains the entire mechanism, of course, but in the present instance, if the obstacle is not immediately disintegrated, the excessive force will result in a downward thrust in shaft 44 which will shear pin 120, in which case shaft 44 will slide freely through block 108 into the dotted position shown in Fig. 2, thus increasing the clearance of the concave relatively to cylinder 16, as in the case of removing pin 106, but without attention on the part of the operator. When the obstruction is removed, it is a simple matter to restore the parts to their original position and replace pin 120 with a fresh one and again the adjustment, obtaining in concave 18 before the accident, is restored.

If, on the other hand, the parts have become strained and inspection indicates that the reading of index 48 does not agree with the readings on dials 64 and 78, the discrepancy is readily apparent and adjustment may be made to correct the condition.

It will now be clear that expedients have been provided for accomplishing the objects of the invention and what is claimed as new and desired to be secured by Letters Patent of the United States is:

1. In a threshing mechanism of the type including a casing, a rotatable cylinder, and a concave cooperating therewith within the casing, the combination of a front support on the concave extending outside of the casing, a rear support on the concave extending outside of the casing, said casing providing enlarged openings through which said supports extend to be shiftable toward and away from said cylinder, a rockshaft journaled in said casing vertically spaced from said cylinder, a lever fixed transversely on one end of said rockshaft outside of said casing, a lever fixed transversely on the other end of said rockshaft outside of said casing, a first link pivoted to each of said levers at a point laterally spaced from said rockshaft and extending generally vertically, each of said links being secured to one end of said front support, a second link pivoted to each of said levers at a point between the first-mentioned point and said shaft, each of said links extending and being secured to one end of said rear support, a block pivotally mounted on one of said levers spaced from said shaft outwardly of said links, a manually rotatable member threadedly engaged in said block and extending transversely of said lever, a bracket fixedly supported on said casing, a pivot on said bracket, a support arm hingedly carried on said pivot, and extending transversely of said manually rotatable member, latch means on said bracket and support arm engaged with each other in one position of said support arm, and adapted to maintain said support arm in fixed position, a thrust block pivotally secured to said support arm spaced from said bracket in the direction of the length of said support arm and providing a bore, said manually rotatable member being journaled in said bore, a thrust element engaged with the end of said thrust block to be pressed thereagainst by a force tending to separate said concave from said cylinder, and means engaged with said manually rotatable member and with said thrust element in position to prevent separation of said thrust element from said thrust block whereby said concave may be adjusted toward and away from said cylinder by rotation of said manually rotatable element, and whereby said concave may be separated from said cylinder while preserving the adjustment of said manually rotatable element by disengagement of said latch means and swinging of said support arm.

2. In a threshing mechanism of the type including a casing, a rotatable cylinder, and a concave cooperating therewith within the casing, the combination of a front support on the concave extending outside of the casing, a rear support on the concave extending outside of the casing, said casing providing enlarged openings through which said supports extend to be shiftable toward and away from said cylinder, a rockshaft journaled in said casing vertically spaced from said cylinder, a lever fixed transversely on one end of said rockshaft outside of said casing, a lever fixed transversely on the other end of said rockshaft outside of said casing, a first link pivoted to each of said levers at a point laterally spaced from said rockshaft and extending generally vertically, each of said links being secured to one end of said front support, a second link pivoted to each of said levers at a point between the first-mentioned point and said shaft, each of said second links extending and being secured to one end of said rear support, a block pivotally mounted on one of said levers, spaced from said shaft outwardly of said links, a manually rotatable member threadedly engaged in said block and extending transversely of said lever, a bracket fixedly supported on said casing, a pivot on said bracket, a support arm hingedly carried on said pivot, and extending transversely of said manually rotatable member, holes in said bracket and support arm registering with each other in one position of said support arm, a pin disposed in said registering holes, and adapted when in place to maintain said support arm in fixed position, a thrust block pivotally secured to said support arm spaced from said bracket in the direction of the length thereof and providing a bore, said manually rotatable member being journaled in said bore, a thrust element engaged with the end of said thrust block to be pressed thereagainst by a force tending to separate said concave from said cylinder, and means engaged with said manually rotatable member and with said thrust element in position to prevent separation of said thrust element from said thrust block whereby said concave may be adjusted toward and away from said cylinder by rotation of said manually rotatable element, and whereby said concave may be separated from said cylinder while preserving the adjustment of said manually rotatable element by withdrawal of said pin and swinging of said support arm.

3. In a threshing mechanism of the type including a casing, a rotatable cylinder, and a concave cooperating therewith within the casing, the combination of a front support on the concave extending outside of the casing, a rear support on the concave extending outside of the casing, said casing providing enlarged openings through which said supports extend to the shiftable toward and away from said cylinder, a rockshaft journaled in said casing vertically spaced from said cylinder, a lever fixed transversely on one end of said rockshaft outside of said casing, a lever fixed transversely on the other end of said rockshaft outside of said casing, a first link pivoted to each of said levers at a point laterally spaced from said rockshaft and extending generally vertically, each of said links being secured to one end of said front support, a second link pivoted to each of said levers at a point between the first-mentioned point and said shaft, each of said links extending and being secured to one end of said rear support, said links being adjustable in length, a pointer on one end of said front support, a pointer on one end of said rear support, a scale fixed adjacent each of said pointers, an index fixed transversely in relation to said rockshaft, a scale fixed adjacent to said index, a block pivotally mounted on one of said levers, spaced from said shaft outwardly of said links, a manually rotatable member threadedly engaged in said block and extending transversely of said lever, a bracket fixedly supported on said casing, a pivot on said bracket, a support arm hingedly carried on said pivot, and extending transversely of said manually rotatable member, means on said bracket and support arm engaged with each other in one position of said support arm, and adapted to maintain said support arm in fixed position, a thrust block pivotally secured to said support arm spaced from said bracket in the direction of the length thereof, and providing a bore, said manually rotatable member being journaled in said bore, a thrust element engaged with the end of said thrust block to be pressed thereagainst by a force tending to separate said concave from said cylinder, and means engaged with said manually rotatable member and with said thrust element in position to prevent separation of said thrust element from said thrust block whereby said concave may be adjusted toward and away from said cylinder by rotation of said manually rotatable element, and whereby said concave may be separated from said cylinder while preserving the adjustment of said manually rotatable element by disengagement of said means and swinging of said support arm.

4. In a threshing mechanism of the type including a casing, a rotatable cylinder, and a concave cooperating therewith within the casing, the combination of a front support on the concave extending outside of the casing, a rear support on the concave extending outside of the casing, said casing providing enlarged openings through which said supports extend to be shiftable toward and away from said cylinder, a rockshaft journaled in said casing vertically spaced from said cylinder, a lever fixed transversely on one end of said rockshaft outside of said casing, a lever fixed transversely on the other end of said rockshaft outside of said casing, a first link pivoted to each of said levers at a point laterally spaced from said rockshaft and extending generally vertically, each of said links being secured to one end of said front support, a second link pivoted to each of said levers at a point between the first-mentioned point and said shaft, each of said links extending and being secured to one end of said rear support, said links being adjustable in length, a pointer on one end of said front support, a pointer on one end of said rear support, a scale fixed adjacent each of said pointers, an index fixed transversely in relation to said rockshaft, a scale fixed adjacent to said index, a block pivotally mounted on one of said levers spaced from said shaft outwardly of said links, a manually rotatable member threadedly engaged in said block and extending transversely of said lever, a bracket fixedly supported on said casing, a pivot on said bracket, a support arm hingedly carried on said pivot, and extending transversely of said manually rotatable member, holes in said bracket and support arm registering with each other in one position of said support arm, a pin disposed in said registering holes, and adapted when in place to maintain said support arm in fixed position, a thrust block pivotally secured to said support arm spaced from said bracket in the direction of the length of said support arm, and providing a bore, said manually rotatable member being journaled in said bore, a thrust element engaged with the end of said thrust block to be pressed thereagainst by a force tending to separate said concave from said cylinder, and means engaged with said manually rotatable member and with said thrust element in position to prevent separation of said thrust element from said thrust block whereby said concave may be adjusted toward and away from said cylinder by rotation of said manually rotatable element, and whereby said concave may be separated from said cylinder while preserving the adjustment of said manually rotatable element, by withdrawal of said pin and swinging of said support arm.

References Cited in the file of this patent

UNITED STATES PATENTS

| | | |
|---|---|---|
| 2,616,433 | Anderson | Nov. 4, 1952 |
| 2,794,438 | Heth | June 4, 1957 |

FOREIGN PATENTS

| | | |
|---|---|---|
| 30,081 | Germany | Jan. 9, 1885 |
| 104,150 | Sweden | Mar. 31, 1942 |